Aug. 1, 1939.  W. H. FINE  2,167,712

BRAKE GEAR SUPPORT

Filed June 20, 1938  2 Sheets-Sheet 1

INVENTOR
*William H. Fine*
BY *Rodney Bedell*
ATTORNEY

Aug. 1, 1939. W. H. FINE 2,167,712
BRAKE GEAR SUPPORT
Filed June 20, 1938 2 Sheets-Sheet 2
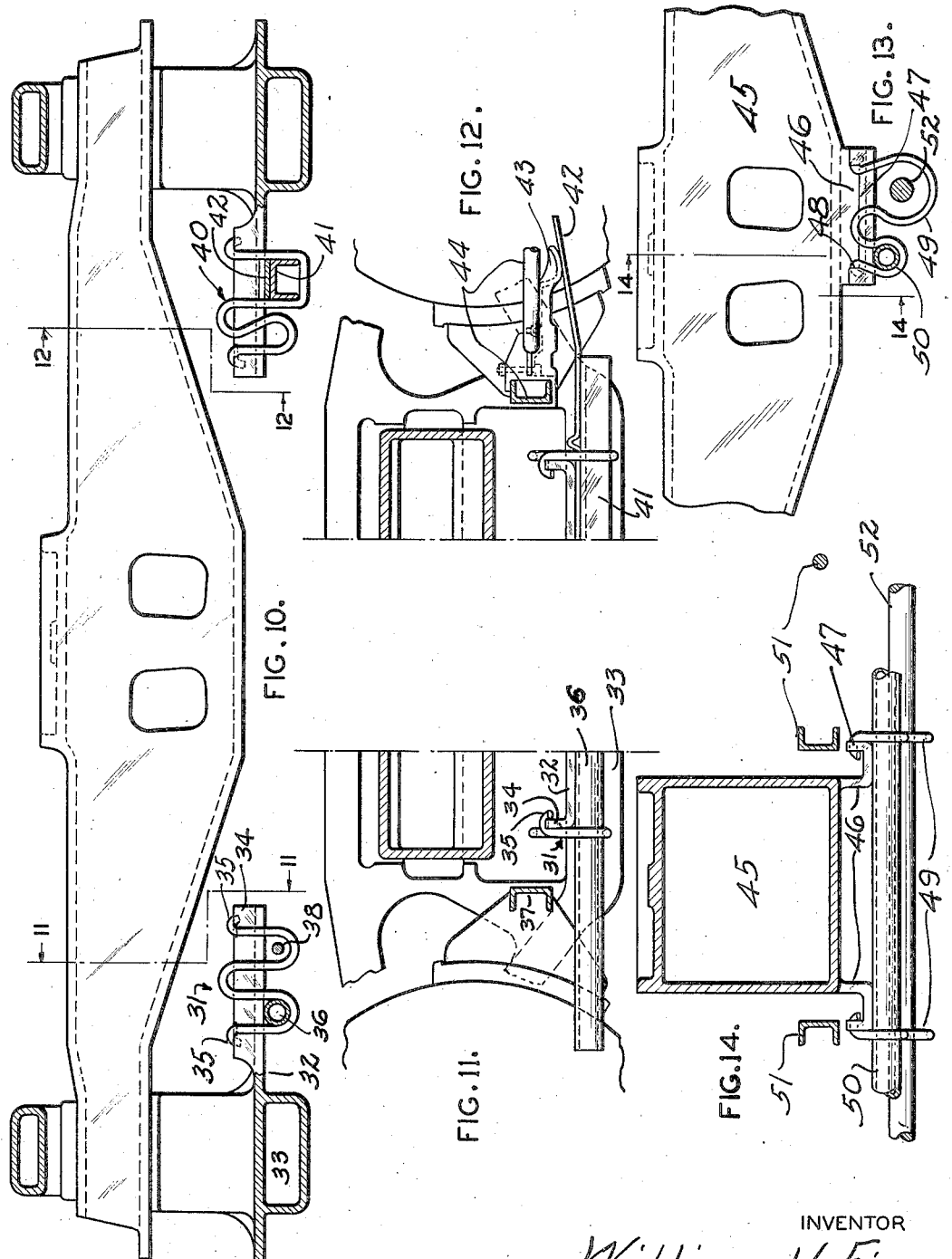
INVENTOR
William H Fine
BY Rodney Bedell
ATTORNEY Patented Aug. 1, 1939

2,167,712

UNITED STATES PATENT OFFICE 2,167,712

BRAKE GEAR SUPPORT

William H. Fine, Los Angeles, Calif., assignor to Chicago Railway Equipment Company, Chicago, Ill., a corporation of Illinois Application June 20, 1938, Serial No. 214,770

17 Claims. (Cl. 188—210)

The invention relates to safety devices for railway brake gear and more particularly to the mounting of such devices on a truck member such as the spring plank, side frame, truck bolster, or other like truck part.

One object of the invention is to effect a simple mounting of a gear support bar upon the carrying truck part, preferably without bolts or rivets passing through the truck part or otherwise involving additional machining of the truck part.

Another object of the invention is to enable the device to be readily applied to or detached from the truck part to accommodate repairs or replacement of the safety device itself or of the brake gear with which it cooperates.

Another object of the invention is to obtain in a single device a structure for safeguarding the brake beam and the brake bottom connection independently of each other.

These and other detailed objects of the invention are attained by the structure illustrated in the accompanying drawings, in which—

Figure 1:
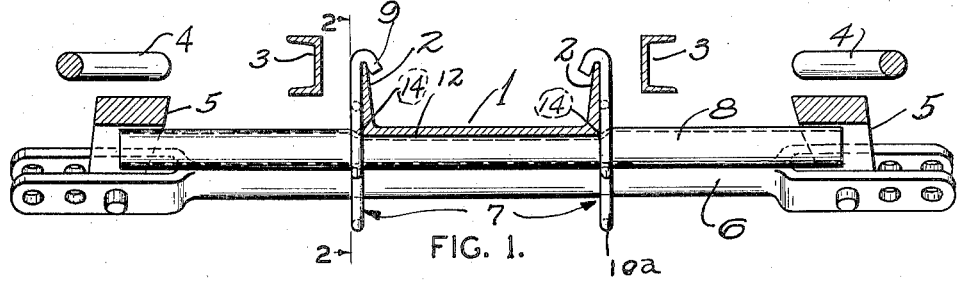
Figure 1 is a transverse section through a railway truck spring plank and brake beams showing also the safety device and associated structure.
Figure 3:
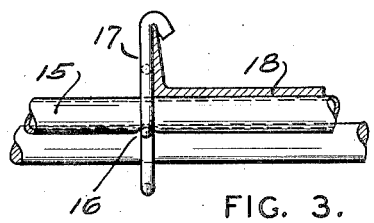

Figure 3 corresponds to a portion of Figure 1 but illustrates another form of the invention.

Figure 4:
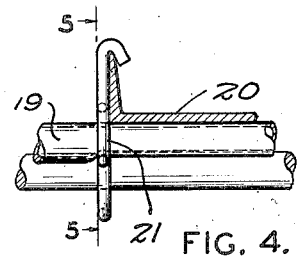
Figure 6:
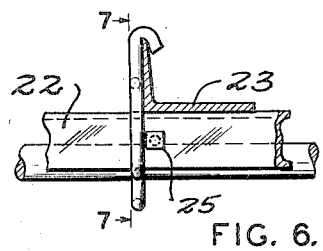
Figure 8:
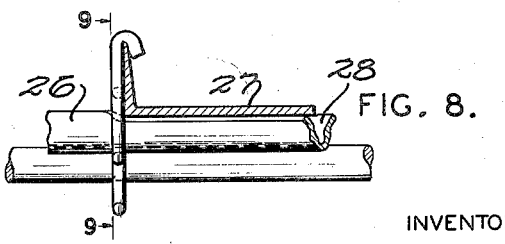

Figures 4, 6, and 8 correspond to Figure 3 but illustrate different forms of the invention.

Figure 2:
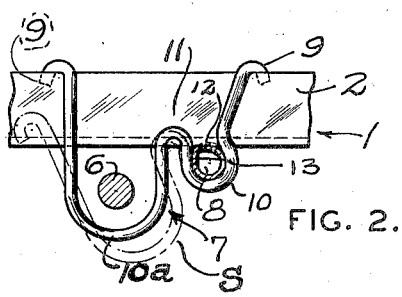
Figure 2 is a vertical section taken approximately on the line 2—2 of Figure 1.
Figure 5:
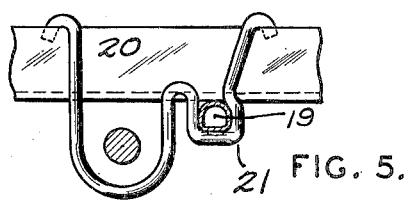
Figure 7:
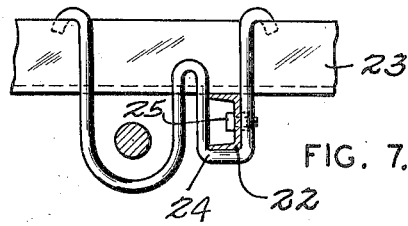
Figure 9:
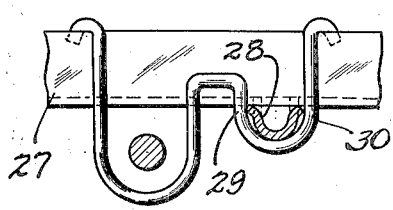

Figures 5, 7, and 9 correspond to Figure 2 but illustrate the forms of the invention shown in Figures 4, 6, and 8, respectively, and are sections taken upon the corresponding section lines of Figures 4, 6, and 8.

Figure 10 is a transverse section through a railway truck showing the invention applied to brackets on the truck side frames.

Figures 11 and 12 are detail sections taken on lines 11—11 and 12—12 of Figure 10.

Figure 13 illustrates the invention as applied to the truck bolster.

Figure 14 is a detail section taken on the line 14—14 of Figure 13.

In the structure illustrated in Figures 1 and 2, the truck spring plank 1 is shown of familiar section having upstanding flanges 2. The brake beams are indicated by the channel shaped compression members 3 and the round tension rods 4 such as are common to truss type brake beams. The brake levers fulcrumed to the brake beams are indicated at 5, and the bottom connection 6 extends longitudinally of the truck between the lower ends of the brake levers 5. All of the above parts are of ordinary construction familiar to those skilled in the art and in themselves do not constitute the present invention.

The safety device includes bracket members 7, applied to opposite sides of spring plank 1, and a rod or pipe 8 underlying the brake beams and held in position by bracket members 7. Each bracket member 7 has a general U-shape with its spaced legs terminating in down-turned lugs 9 arranged to be hooked over the spring plank flange 2.

The portion 10 of bracket 7 supporting pipe 8 extends just far enough beneath the bottom of spring plank 1 to receive pipe 8 and hold it snugly against the bottom of the spring plank. Preferably, but not necessarily, bracket 7 includes a portion 10a arranged to underlie bottom connection 6 and form a safety guard therefor. The down-turned loop or corrugation 11 intermediate portions 10 and 10a provides a degree of elasticity or springiness to yieldingly thrust pipe 8 against the spring plank and prevent rattling. The bracket is given an initial set, as indicated in dot and dash lines at S. Then when the left-hand leg is pried upwardly and hooked over the spring plank flange, tension will be developed tending to hold the bracket and support arm in place.

Preferably pipe 8 is deformed adjacent to the spring plank and bracket 7 for the purpose of preventing play of the support member in its mounting. In Figures 1 and 2, the deformation consists in flattening the top and one side of the pipe, as shown at 12 and 13, respectively, throughout the width of the spring plank. Resulting shoulders 14 oppose vertical faces on the spring plank and prevent the longitudinal movement of member 8 through the brackets.

Figure 3 illustrates a form of the invention substantially like that described above but in which the deformation of the support member 15 consists of an indentation 16 arranged to engage the bottom of the pipe supporting loop of the mounting bracket 17 and thereby prevent relative movement of member 15 and the brackets and spring plank 18.

In Figures 4 and 5, the supporting pipe 19 is flattened on the bottom and both sides throughout the width of the spring plank 20 and these portions of the pipe are engaged by similar straight lined portions of the supporting bracket loop 21. This arrangement gives an increased bearing area between the pipe and the bracket.

Otherwise the structure is substantially the same as previously described.

Figures 6 and 7 illustrate a form of the invention in which the brake beam support arm 22 comprises an angular member, such as a rolled structural steel channel with one flange engaging the bottom of the spring plank 23 and with the other flange supported by the loop 24 of the bracket. Channel 22 is held against longitudinal movement relative to the spring plank and bracket by bolts 25 at the inner side of each bracket. Or these bolts could be arranged on opposite sides of the same bracket. In this embodiment of the invention there is no deformation of the support arm.

Figures 8 and 9 illustrate another modification of the invention utilizing a pipe support arm 26 having the portion beneath the spring plank 27 split and spread outwardly, as indicated at 28, to provide spaced bearing elements against the bottom of the spring plank and against the vertical elements 29 and 30 of the supporting bracket.

In Figures 10 and 11 the bracket 31 is mounted on a carrier 32 extending inwardly from the truck side frame lower member 33. Carrier 32 has upturned flanges 34 corresponding to the flanges of the channel spring planks previously described, and these flanges are similarly engaged by the hooked ends 35 of bracket 31.

The bracket is shown as clamping a pipe 36 against the bottom of the side frame carrier part 32, the pipe forming a safety member underlying the brake beam indicated at 37. With this arrangement the carrier and bracket are located necessarily adjacent to the truck side frame in a position which would prevent cooperation between the bracket and the ordinary bottom connection for brake levers extending adjacent to the longitudinal center line of the truck, but where clasp brakes are used with levers at each side of the truck, the inner loop of the bracket may receive a lever connection 38. The carrier extending inwardly from the truck side frame at the righthand side of Figure 10 corresponds to the carrier on the lefthand side of the figure but the bracket 40 is shaped to receive a downwardly facing channel shaped support member 41 extending a short distance on either side of the carrier and supporting a spring metal strip 42 inclined upwardly beyond the end of channel 41 and cooperating with a chair 43 on the brake beam 44 to form a guide for the beam in its movement to and from the wheel as well as forming a safety guard to prevent the beam dropping to the rail in the event of failure of its usual hanger (not shown).

Even though the inner loop of bracket 40 has no gear-engaging function, it would serve to provide adequate tension for holding the support and guide elements 41 and 42 in assembled relation with the carrier.

The arrangement shown in Figures 10, 11 and 12 could be embodied in spring plankless truck structure, or in a truck having a spring plank in which the support bracket is below the level of the spring plank. The carrier flanges may depend from its web and the bracket be inverted to mount and secure a safety support extending over the carrier instead of beneath it as shown.

Figures 13 and 14 illustrate the invention applied to a truck bolster 45 provided with projections 46 either formed integrally with the bolster or attached thereto, each having an upturned flange or edge 47 with opposing shoulders 48. The flanges and shoulders engage the hooked ends of a bracket 49 resembling the brackets previously described and arranged to clamp a support pipe 50 to the bolster projection, the pipe extending in opposite directions from the bolster to underlie the brake beams indicated at 51. The bracket includes a part substantially encircling the bottom connection 52, and the bracket functions similarly to the brackets previously described and applied to a truck spring plank or to a member extending inwardly from a truck side frame.

In all forms of the invention the main objects set forth in the introductory portion of the specification are attained. When the device is applied to the spring plank, there is no punching, drilling, notching, fitting, or other work done on the spring plank as is required with many devices for the same general purpose, the same being open to objection as tending to weaken the spring plank and as adding to the expense of safety guard installation, particularly where the guard is applied to trucks already in service.

The provision of the double loop in a supporting bracket makes it possible to spring the device onto the up-turned flanges of the spring plank or other carrier and at the same time snugly clamp the support arm between the carrier and the bracket. The device is readily applied to and removed from the truck part when it is necessary to repair or replace any part of the device or of the brake gear with which it is associated.

Obviously the details of the structure may be varied in numerous ways other than those suggested herein without departing from the spirit of the invention and the exclusive use of such modifications as come within the scope of the claims is contemplated.

What is claimed is:

1. A railway truck brake gear safety or support device comprising a brake gear engaging bar adapted to extend transversely of a carrier member on a truck part and beyond the same to underlie a brake gear element, and means for attaching said bar to the carrier member comprising a bracket with its ends arranged to hook over the carrier member and with its body intermediate its ends adapted to yield and arranged to be distorted to engage said bar and thrust it against the carrier member.

2. A railway truck brake gear safety or support device comprising a U-shaped bracket with its legs arranged to hook over an upturned edge of a carrier member on a truck part and with its intermediate portion constructed to yield and being of a depth to depend slightly below the bottom of the carrier member, and an elongated element constructed and adapted to be carried by said intermediate portion in contact with the carrier member and arranged to underlie an adjacent brake gear element.

3. A device as described in claim 1 which also includes a shoulder on the gear engaging bar facing longitudinally of its length to contact an opposing exteriorly facing element on the carrier member to limit the longitudinal movement of said bar relative to the carrier member.

4. A device as described in claim 1 in which the gear engaging bar and the attaching bracket have oppositely facing elements preventing relative movement of the bar transversely of the carrier member and said attaching bracket.

5. A device as described in claim 1 in which the gear engaging bar consists of a round pipe, a restricted portion of which is deformed to provide extended contact with the bottom of the carrier member to hold the bar against movement relative thereto.

6. A device as described in claim 1 in which the gear engaging bar consists of a light structural member having a flat upper face disposed for extended contact with the bottom of the carrier member for holding the bar against rotation relative to the carrier member, there being means also for holding said bar against movement transversely of the carrier member and the attaching bracket.

7. A railway truck brake gear safety or support device comprising an attaching bracket having spaced legs terminating in downwardly disposed hooks arranged to engage the up-turned edge of a carrier member, said member between said legs forming a double loop, and an elongated gear engaging element constructed and arranged to be held in contact with the carrier member by one of said loops through the elasticity of the other of said loops.

8. A device for attaching a brake gear safety bar to a railway truck part having a vertical flange comprising a U-shaped member with hooked ends for engaging said flange and with its intermediate portion forming a double loop, one of which may snugly engage said bar and the other of which may loosely inclose a brake bottom connecting rod.

9. A device for attaching a brake gear safety bar to a railway truck frame part having an upturned flange comprising a U-shaped member with hooked ends for engaging the truck part flange and with its intermediate portion corrugated to provide elasticity and with a part of said portion shaped to snugly engage the bottom and a side of the bar.

10. In combination with a railway truck frame part having an upturned edge, a member with downwardly facing hooks engaging said edge and forming an upwardly facing U-shaped loop between said hooks and depending below said truck part and including a vertically yielding portion, and an elongated element extending transversely of said truck part and supported by said loop by distorting said portion to thrust said element against said truck part, said element projecting beyond said truck part to underlie a portion of the truck brake gear.

11. In combination with a railway truck spring plank member having up-turned edges along its sides, a mounting member at each side of said spring plank member having downwardly facing hooks engaging the corresponding edge of the spring plank member and forming an upwardly facing U-shaped loop between said hooks and depending below the spring plank member, and including a vertically yielding portion, and an elongated element extending transversely of the spring plank member and supported by said loops by distorting said portion to thrust said element against the bottom of said spring plank member and projecting beyond said spring plank member to underlie a portion of the truck brake gear, said element being deformed adjacent to at least one of said members to positively engage the same to prevent movement of said element transversely of said members.

12. In combination with a railway truck channel spring plank, a U-shaped attaching member at each side of said spring plank comprising a bar with upright legs terminating in downwardly facing ends hooked over the upwardly facing edges of said spring plank flanges, and a pipe yielding thrust against the bottom of said spring plank by said member and projecting outwardly from said spring plank in opposite directions to underlie the truck brake gear.

13. In combination with a railway truck side frame having an inwardly extending projection, a brake beam guard, guide or support member in contact with one side of said projection, there being a rib on said projection facing away from said side, and a bracket with its ends hooked over said rib and yielding intermediate its ends and engaging said member to hold it against said projection.

14. In combination with a railway truck side frame having an inwardly extending projection of upwardly facing channel section, a brake gear guard, guide, or support bar extending beneath said projection, and a bracket for holding said bar to said projection comprising a rod with downturned ends hooked over a flange of said projection and intermediate its ends being corrugated to provide elasticity to yieldingly clamp said bar to said projection.

15. A structure as described in claim 14 in which the bar holding bracket also includes a loop disposed to underlie a bottom connection rod forming part of the brake gear.

16. In combination with a railway truck bolster provided with a projection including an upturned rib, a brake gear guard, guide, or support member extending beneath said projection, and a U-shaped bar with downturned hooks on the ends of its legs to engage said rib and intermediate its ends being shaped to support said bar and yieldingly thrust it against the bottom of said projection irrespective of inaccuracy in fitting and normal wear in operation.

17. In combination with a railway truck bolster provided with a projection including an upturned rib, a brake gear guard, guide, or support member extending beneath said projection, a brake lever bottom connection extending beneath said bolster, and a U-shaped bar with downturned hooks on the ends of its legs to engage said rib and intermediate its ends forming a plurality of upturned loops for clamping said bar to said projection and for loosely receiving said bottom connection to prevent the latter from falling to the road bed.

WILLIAM H. FINE.